United States Patent
Zhang et al.

(10) Patent No.: US 11,853,741 B2
(45) Date of Patent: Dec. 26, 2023

(54) FEDERATED LEARNING FOR CONNECTED CAMERA (71) Applicant: GM GLOBAL TECHNOLOGY OPERATIONS LLC, Detroit, MI (US)

(72) Inventors: Wende Zhang, Birmingham, MI (US); Esther Anderson, Canton, MI (US); Mark T Gaylord, Lake Orion, MI (US); Robert A Dziurda, Waterford, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 167 days.

(21) Appl. No.: 17/647,524

(22) Filed: Jan. 10, 2022

(65) Prior Publication Data

US 2023/0221942 A1 Jul. 13, 2023

(51) Int. Cl.
*G06F 8/65* (2018.01)
*G06F 8/71* (2018.01)
*G06F 18/214* (2023.01)
*G06F 18/2415* (2023.01)
*G06T 7/70* (2017.01)
*G06V 10/00* (2022.01)
*G06V 20/00* (2022.01)

(52) U.S. Cl.
CPC ............... *G06F 8/65* (2013.01); *G06F 8/71* (2013.01); *G06F 18/2148* (2023.01); *G06F 18/2415* (2023.01); *G06T 7/70* (2017.01); *G06V 10/00* (2022.01); *G06V 20/00* (2022.01); *G06T 2207/20081* (2013.01); *G06T 2207/20084* (2013.01); *G06T 2207/30252* (2013.01)

(58) Field of Classification Search
CPC ......... G06F 8/65; G06F 18/2148; G06T 7/70; G06V 10/00; G06V 20/00
See application file for complete search history.

(56) References Cited

U.S. PATENT DOCUMENTS

2022/0250656 A1* 8/2022 Ucar ................... G06V 20/56

OTHER PUBLICATIONS

U.S. Appl. No. 17/470,454, filed Sep. 9, 2021. Automated Incident Detection for Vehicles. Zhang et al.
Elbir, A. M., Soner, B., & Coleri, S. (2020). Federated Learning in Vehicular Networks. arXiv preprint arXiv:2006.01412.
Wikipedia contributors. (Jan. 5, 2022). Federated learning. In Wikipedia, The Free Encyclopedia. Retrieved 18:54, Jan. 10, 2022, from https://en.wikipedia.org/w/index.php?title=Federated_learning&oldid=1063940736.

(Continued)

*Primary Examiner* — On S Mung
(74) *Attorney, Agent, or Firm* — Lorenz & Kopf LLP (57) ABSTRACT Vehicles and related systems and methods are provided for classifying detected objects in a location-dependent manner using localized models in a federated learning environment. A method involves obtaining sensor data for a detected object external to the vehicle from a sensor of a vehicle, obtaining location data associated with the detected object, obtaining a local classification model associated with an object type, assigning the object type to the detected object based on an output by the local classification model as a function of the sensor data and the location data using the local classification model, and initiating an action at the vehicle responsive to assigning the object type to the detected object.

19 Claims, 6 Drawing Sheets

(56) References Cited

OTHER PUBLICATIONS

[Definition of Federated Learning] (n.d.) retrieved 19:18, Jan. 10, 2022, from https://paperswithcode.com/task/federated-learning.

Lee, Reena. (Dec. 16, 2016). Gboard, now available for Android. Retrieved 19:21, Jan. 10, 2022, from https://blog.google/products/search/gboard-now-on-android/.

* cited by examiner

FEDERATED LEARNING FOR CONNECTED CAMERA

INTRODUCTION

The technical field generally relates to vehicles and more particularly relates to automated incident detection for vehicles based on captured images using federated learning.

Modern vehicles (e.g., a car, a motorcycle, a boat, or any other type of automobile) may be equipped with a vehicular communication system that facilitates different types of communication between the vehicle and other entities. For example, a vehicular communication system can provide for vehicle-to-infrastructure (V2I), vehicle-to-vehicle (V2V), vehicle-to-pedestrian (V2P), and/or vehicle-to-grid (V2G) communication. Collectively, these may be referred to as vehicle-to-everything (V2X) communication that enables communication of information between the vehicle and any other suitable entity. Various applications (e.g., V2X applications) can use V2X communications to send and/or receive safety messages, maintenance messages, vehicle status messages, and the like.

Modern vehicles can also include one or more cameras that provide back-up assistance, take images of the vehicle driver to determine driver drowsiness or attentiveness, provide images of the road as the vehicle is traveling for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

Such vehicles can also be equipped with sensors such as a radar device(s), LiDAR device(s), and/or the like for performing target tracking. Target tracking includes identifying a target object and tracking the target object over time as the target object moves with respect to the vehicle observing the target object. Images from the one or more cameras of the vehicle can also be used for performing target tracking.

These communication protocols, cameras, and/or sensors can be useful for monitoring vehicles and the environment around the vehicles.

In practice, vehicles operate in different environments that exhibit regional variations, resulting in data diversity that can complicate labeling and decrease the convergence rate for machine learning models. Accordingly, it is desirable to improve model performance in a manner that accounts for regional variations. Other desirable features and characteristics will become apparent from the subsequent detailed description and the appended claims, taken in conjunction with the accompanying drawings and the foregoing technical field and background.

SUMMARY

A method is provided for assigning an object type to a detected object using a local classification model that accounts for location. The method involves obtaining, at a vehicle, sensor data for a detected object external to the vehicle from a sensor of the vehicle, obtaining, at the vehicle, location data associated with the detected object, obtaining, at the vehicle, a local classification model associated with an object type, assigning the object type to the detected object based on an output by the local classification model as a function of the sensor data and the location data using the local classification model, and initiating, at the vehicle, an action responsive to assigning the object type to the detected object.

An apparatus is provided for a vehicle that includes a sensor to provide sensor data for a detected object external to the vehicle, a navigation system to provide location data for the vehicle contemporaneous to the sensor data, a memory comprising computer readable instructions and a local classification model associated with an object type, and a processing device for executing the computer readable instructions. The computer readable instructions control the processing device to perform operations involving assigning the object type to the detected object based on an output by the local classification model as a function of the sensor data and the location data using the local classification model and initiating an action responsive to assigning the object type to the detected object.

A vehicle system is provided that includes a remote server and a vehicle. The remote server is configurable to provide a classification model for an object type. The vehicle is coupled to the remote server over a network to obtain the classification model from the remote server. The vehicle includes a sensor to provide sensor data for a detected object external to the vehicle, a navigation system to provide location data for the vehicle contemporaneous to the sensor data, a memory comprising computer readable instructions and a processing device for executing the computer readable instructions. The computer readable instructions control the processing device to perform operations including assigning the object type to the detected object based on an output by the classification model as a function of the sensor data using the first classification model and responsive to assigning the object type to the detected object, determining a local classification model for the object type using the sensor data and the location data associated with the detected object.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses.

Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

The subject matter described herein generally pertains to automated incident detection for vehicles, for example, for automatic traffic incident recording and reporting. One or more exemplary embodiments described herein provide for recording an incident external to the vehicle, such as a traffic incident (e.g., a traffic stop by a law enforcement officer, an accident, etc.), or any other event external to the vehicle that acts as a trigger and then taking an action, such as controlling the vehicle, and/or reporting the incident, such as to an emergency dispatcher, another vehicle, etc.

Conventional approaches to incident detection and reporting for vehicles are insufficient. For example, incident detection and reporting is largely a manual process that requires human detection and triggering of reporting. Consider the example of a law enforcement officer pulling over a target vehicle for a traffic stop. In such cases, an occupant of the target vehicle would have to manually detect that the target vehicle is being pulled over and then manually initiate recording, such as on a mobile phone (e.g., a smart phone) or camera system within the target vehicle, of the traffic stop. If it is desired to report the incident, such as to a family member, an emergency response agency, or the like, such reporting is typically performed manually, such as through a phone call. Further, if an incident occurs to another vehicle other than the target vehicle, occupants of the target vehicle may be unaware of the incident (e.g., the occupants cannot see the incident).

One or more embodiments described herein address these and other shortcomings of the prior art by detecting incidents, initiating recording using one or more sensors (e.g., cameras, microphones, etc.), and reporting the incident. As one example, a method according to one or more embodiments can include detecting an incident (e.g., detecting an emergency vehicle, a law enforcement vehicle, or the like), initiating recording of audio and/or video, overlaying data (e.g., speed, location, timestamp, etc.) on the video, uploading the audio and/or video recordings to a remote processing system (e.g., a cloud computing node of a cloud computing environment), and issuing an alert (also referred to as a "notification"). In some examples, the audio and/or video recordings can be used to reconstruct a scene or incident. In some examples, one or more vehicles involved in the incident (e.g., a target vehicle, the law enforcement vehicle, etc.) can be controlled, such as by causing windows to roll down, causing lights to be turned on, causing an alert within one or more of the vehicles to be issued, and the like.

One or more embodiments described herein provide advantages and improvements over the prior art. For example, the described technical solutions can provide video/audio of what happened when an incident occurs (e.g., when a vehicle operator was pulled over by law enforcement) and also provides evidence of the incident in real-time, including alerts to third parties of the incident. Further, the described technical solutions can provide real time assistance to the vehicle operator during a traffic stop or incident by providing real time video and/or audio. Further advantages of the present techniques can include behavioral adjustments from parties involved in the incident to improve outcomes. Further advantages include using data about a detected event to control a vehicle, such as to steer the vehicle clear of an approaching emergency vehicle.

Figure 1:
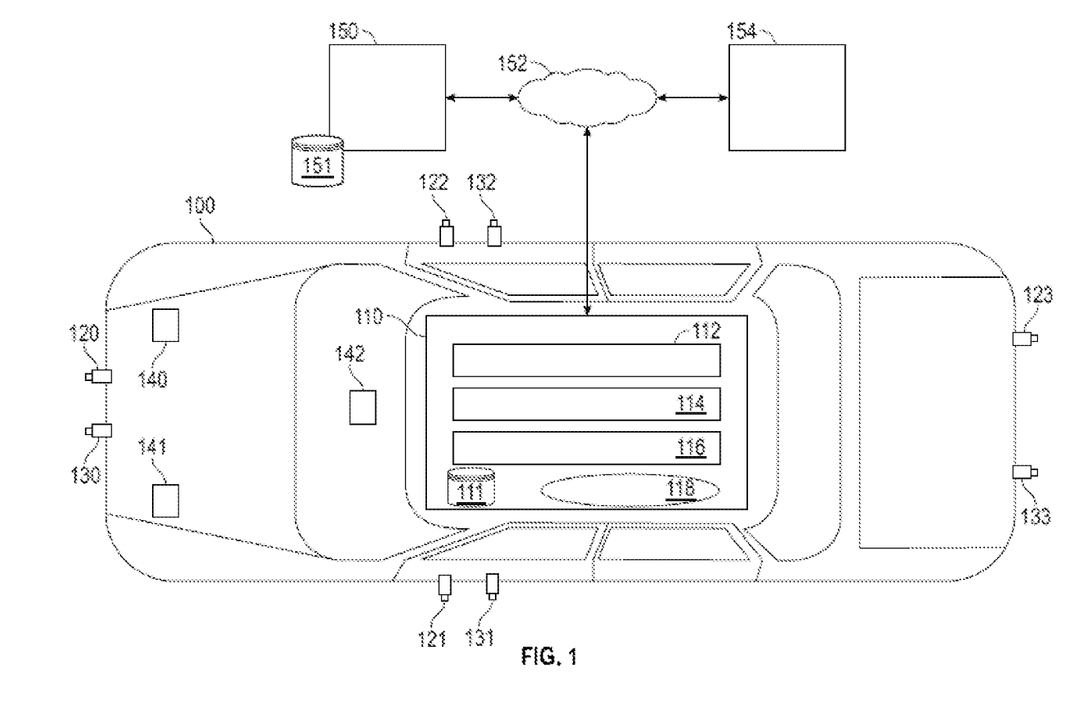
FIG. 1 depicts a vehicle including sensors and a processing system according to one or more embodiments described herein.

FIG. 1 depicts a vehicle 100 including sensors and a processing system 110 according to one or more embodiments described herein. In the example of FIG. 1, the vehicle 100 includes the processing system 110, cameras 120, 121, 122, 123, cameras 130, 131, 132, 133, a radar sensor 140, a LiDAR sensor 141, and a microphone 142. The vehicle 100 may be a car, truck, van, bus, motorcycle, boat, plane, or another suitable vehicle 100.

The cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be useful for operating the vehicle (e.g., parking, backing, etc.). These images can also be useful for capturing an incident, such as a traffic stop, an accident, etc. The cameras 130-133 are long-range cameras that capture images external to the vehicle and farther away from the vehicle 100 than the cameras 120-123. These images can be useful for object detection and avoidance, for example. These images can also be useful for capturing an incident, such as a traffic stop, an accident, etc. It should be appreciated that, although eight cameras 120-123 and 130-133 are shown, more or fewer cameras may be implemented in various embodiments.

Captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view. In some examples, the images captured by the cameras 120 123 and 130 133 can be stored to a data store 111 of the processing system 110 and/or to a remote data store 151 associated with a remote processing system 150.

The radar sensor 140 measures range to a target object by transmitting electromagnetic waves and measuring the reflected waves with a sensor. This information is useful for determining a target object's distance/location relative to the vehicle 100. It should be appreciated that the radar sensor 140 can represent multiple radar sensors.

The LiDAR (light detection and ranging) sensor 141 measures distance to a target object (e.g., other vehicle 154) by illuminating the target with pulsed or continuous wave laser light and measuring the reflected pulses or continuous wave with a detector sensor. This information is useful for determining a target object's distance/location relative to the vehicle 100. It should be appreciated that the LiDAR sensor 141 can represent multiple LiDAR sensors.

The microphone 142 can record soundwaves (e.g., sounds or audio). This information is useful for recording sound information about the vehicle 100 and/or the environment proximate to the vehicle 100. It should be appreciated that the microphone 142 can represent multiple microphones and/or microphone arrays, which can be disposed in or on the vehicle such that the microphone 142 can record soundwaves in an interior (e.g., passenger compartment) of the vehicle and/or external to the vehicle.

Data generated from the cameras 120-123, 130-133, the radar sensor 140, the LiDAR sensor 141, and/or the microphone 142 can be used to detect and/or track a target object relative to the vehicle 100, to detect an incident, and the like. Examples of target objects include other vehicles (e.g., the other vehicle 154), emergency vehicles, vulnerable road users (VRUs) such as pedestrians, bicycles, animals, potholes, oil on a roadway surface, debris on a roadway surface, fog, flooding, and the like.

Figure 2:
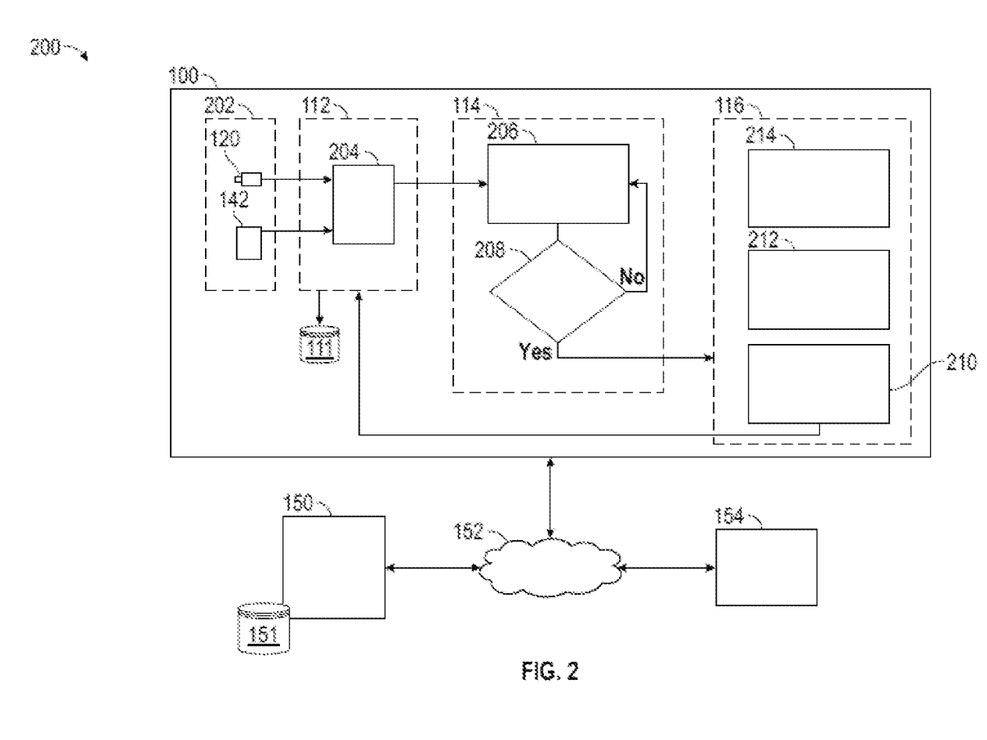
FIG. 2 depicts a block diagram of a system for automated incident detection for vehicles according to one or more embodiments described herein.

The processing system 110 includes a data/communication engine 112, a decision engine 114 to detect and classify, a control engine 116, the data store 111, and a machine learning (ML) model 118. The data/communication engine 112 receives/collects data, such as from sensors (e.g., one or more of the cameras 120 123, 130 133; the radar sensor 140; the LiDAR sensor 141; the microphone 142; etc.) associated with the vehicle 100 and/or receives data from other sources such as the remote processing system 150 and/or the other vehicle 154. The decision engine 114 processes the data to detect and classify incidents. The decision engine 114 can utilize the ML model 118 according to one or more embodiments described herein. An example of how the decision engine 114 processes the data is shown in FIG. 2, among others, and is described further herein. The control engine 116 controls the vehicle 100, such as to plan a route and execute a driving maneuver (e.g., change lanes, change velocity, etc.), initiate recording from sensors of the vehicle 100, cause recorded data to be stored in the data store 111 and/or the data store 151 of the remote processing system 150, and perform other suitable actions. The processing system 110 can include other components, engines, modules, etc., such as a processor (e.g., a central processing unit, a graphics processing unit, a microprocessor, etc.), a memory (e.g., a random-access memory, a read-only memory, etc.), data store (e.g., a solid state drive, a hard disk drive, mass storage, etc.) and the like.

The processing system 110 can be communicatively coupled to a remote processing system 150, which can be an edge processing node as part of an edge processing environment, a cloud processing node as part of a cloud processing environment, or the like. The processing system 110 can also be communicatively coupled to one or more other vehicles (e.g., other vehicle 154). In some examples, the processing system 110 is communicatively coupled to the processing system 150 and/or the other vehicle 154 directly (e.g., using V2V communication), while in other examples, the processing system 110 is communicatively coupled to the processing system 150 and/or the other vehicle 154 indirectly, such as by a network 152. For example, the processing system 110 can include a network adapter that enables the processing system 110 to transmit data to and/or receive data from other sources, such as other processing systems, data repositories, and the like including the remote processing system 150 and the other vehicle 154. As an example, the processing system 110 can transmit data to and/or receive data from the remote processing system 150 directly and/or via the network 152.

The network 152 represents any one or a combination of different types of suitable communications networks such as, for example, cable networks, public networks (e.g., the Internet), private networks, wireless networks, cellular networks, or any other suitable private and/or public networks. Further, the network 152 can have any suitable communication range associated therewith and may include, for example, global networks (e.g., the Internet), metropolitan area networks (MANs), wide area networks (WANs), local area networks (LANs), or personal area networks (PANs). In addition, the network 152 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

According to one or more embodiments described herein, the remote processing system 150, the other vehicle 154, and the processing system 110 communicate via a vehicle-to-infrastructure (V2I), vehicle-to-vehicle (V2V), vehicle-to-pedestrian (V2P), and/or vehicle-to-grid (V2G) communication.

The features and functionality of the components of the processing system 110 are now described in more detail. The processing system 110 of the vehicle 100 aids in automated incident detection for vehicles.

According to one or more embodiments described herein, the processing system 110 combines sensor input and driving behavior with artificial intelligence (AI) and machine learning (ML) (e.g., federated learning) to determine when the vehicle 100 is involved in an incident (e.g., a traffic stop) and automatically takes action(s), such as recording data using sensors associated with the vehicle, connecting to third parties, controlling the vehicle (e.g., rolling down windows, turning on hazard lights and/or interior lights, etc.), adding overlay information to recorded data (e.g., speed, GPS, and time stamp added to a recorded video), and the like. The processing system 110 can also issue notifications/alerts, such as providing a message on a display of the vehicle 100 communicating to the operator/occupant that the incident has occurred, notifying emergency contacts and/or emergency dispatcher of the incident.

According to one or more embodiments described herein, the processing system 110 can perform automatic AI/ML triggering of features based on fusion of sensor data (e.g., data from cameras, microphones, etc.) with driving behavior observed by exterior vehicle sensors (e.g., one or more of the cameras 120 123, 130 133; the microphone 142, etc.). The processing system 110 can incorporate AI/ML (for example, through enhanced federated learning) triggers to initiate recording, such as emergency lights, sirens, speed, and vehicle harsh maneuvering. In some examples, the processing system 110 can cause local and/or remote data capturing/recording to ensure data ownership/security. For example, raw data is saved locally in the vehicle 100 (e.g., in the data store 111) and in a mobile device (not shown) of an operator/occupant of the vehicle 100. Further the federated learned data and 3D reconstruction primitives can be uploaded to third parties, such as the remote processing system 150 and/or the other vehicle 154.

The processing system 110 can also, in some examples, enable third-party data collection and/or notifications and can provide for multi-vehicle observation/processing. For example, the processing system 110 can send an alert to an emergency dispatch service (e.g., the remote processing system 150) to initiate emergency operations. This can include sending the data collected by vehicle sensors to the remote processing system 150 in some examples. The processing system 110 can also send an alert to the other vehicle 154 to cause the other vehicle (e.g., a third-party witness) to collect data using one or more sensors (not shown) associated with the other vehicle 154. In some examples, the processing system 110 can access data from the other vehicle 154 (which may represent one or more vehicles) for 3D scene reconstruction through federated learning (or other suitable machine learning technique). For example, a multiple view/camera scene reconstruction techniques can be implemented using video collected from the vehicle 100 (and one or more neighboring vehicles (e.g., the other vehicle 154)) for the 3D scene modeling, and the audio associated with the video can be saved or enhanced by noise cancelling techniques. When the data from the neighboring vehicle (e.g., the other vehicle 154) within a proximity to the vehicle 100 are processed for the 3D scene reconstruction in the vehicle 100, an edge processing node or a cloud computing node (e.g., using either motion stereo or shape—from motion), the vehicle 100 sends relevant data/model using machine learning or federated learning approaches to protect the data privacy. That is, data that are not deemed relevant (e.g., data collected from before the incident, data collected from the passenger compartment of a neighboring vehicle, etc.) are not sent for scene reconstruction to provide for data privacy.

According to one or more embodiments described herein, the processing system 110 can, upon a detection of a law enforcement vehicle for example, prepare the vehicle 100, such as by rolling up/down windows, turning on hazard lights, turning on interior lights, providing a message on a display of the vehicle (e.g., "emergency vehicle behind"), and the like.

Turning now to FIG. 2, a block diagram of a system 200 for automated incident detection for vehicles is provided according to one or more embodiments described herein. In this example, the system 200 includes the vehicle 100, the remote processing system 150, and the other vehicle 154 communicatively coupled by the network 152. It should be appreciated the other vehicle 154 can be configured similarly to the vehicle 100 as shown in FIG. 1 and as described herein. In some examples, additional other vehicles can be implemented.

As in FIG. 1, the vehicle 100 includes sensors 202 (e.g., one or more of the cameras 120 123, 130 133, the radar sensor 140, the LiDAR sensor 141, the microphone 142, etc.). At block 204, the data/communication engine 112 receives data from the sensors 202. This can include actively collecting the data (e.g., causing the sensors 202 to collect the data) or passively receiving the data from the sensors 202.

The decision engine 114 processes the data collected at block 204 by the data/communication engine 112. Particularly, at block 206, the decision engine 114 monitors the sensors 202, using the data received/collected at block 204, for an indication of an incident. According to one or more embodiments described herein, the decision engine 114 can utilize artificial intelligence (e.g., machine learning) to detect features within the sensor data (e.g., a captured image, a recorded soundwave, etc.) that are indicative of an incident. For example, features commonly associated with an emergency vehicle can be detected, such as flashing lights, sirens, indicium/symbol on the vehicle, etc.

More particularly, aspects of the present disclosure can utilize machine learning functionality to accomplish the various operations described herein. More specifically, one or more embodiments described herein can incorporate and utilize rule-based decision making and artificial intelligent (AI) reasoning to accomplish the various operations described herein. The phrase "machine learning" broadly describes a function of electronic systems that learn from data. A machine learning system, module, or engine (e.g., the decision engine 114) can include a trainable machine learning algorithm that can be trained, such as in an external environment (e.g., an edge processing node, a cloud processing node, or the like), to learn functional relationships between inputs and outputs that are currently unknown, and the resulting model (e.g., the ML model 118) can be used to determine whether an incident has occurred. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read. Similarly, the decision engine 114 can utilize the ML model 118 to detect an incident. For example, the decision engine 114 can detect, using image recognition techniques, an emergency vehicle in an image captured by the camera 120, can detect, using audio processing techniques, a siren of an emergency vehicle in a soundwave captured by the microphone 142, and the like.

At decision block 208, it is determined whether an incident is detected at block 206. If at decision block 208, it is determined that an incident has not occurred, the decision engine 114 continues to monitor the sensors 202 for an indication of an incident.

However, if at decision block 208 it is determined that an incident has occurred, the control engine 116 initiates recording/storage of data from the sensors 202 at block 210. This can include storing previously captured data and/or causing future data to be captured and stored. The data can be stored locally, such as in the data store 111, and/or remotely, such as in the data store 151 of the remote processing system 150 or another suitable system or device. The control engine 116 can also take an action at block 212 and/or issue a notification at block 214 responsive to the decision engine 114 detecting an incident. Examples of actions that can be taken at block 212 include, but are not limited to: controlling the vehicle 100 (e.g., causing the vehicle 100 to execute a driving maneuver, such as changing lanes, changing velocities, etc.; causing the vehicle 100 to turn on one or more of its lights; causing the vehicle 100 to roll down/up one or more of its windows; etc.), causing the recorded data to be modified (e.g., overlaying GPS data, speed/velocity data, location data, a timestamp, etc. on recorded video; combining recorded soundwaves and recorded video; etc.), and other suitable actions. Examples of notifications that can be issued at block 214 can include, but are not limited to: presenting an audio and/or visual prompt to an operator or occupant of the vehicle 100 (e.g., presenting a warning message on a display within the vehicle, playing a warning tone within the vehicle, etc.), alerting a third-party service (e.g., an emergency dispatch service, a known contact of an operator or occupant of the vehicle, etc.), sending an alert to the other vehicle 154 and/or the remote processing system 150, etc. The type of action taken and/or the type of notification issued can be based on one or more of: user preferences; type of incident detected; geographic-based laws, regulations, or customs; and the like.

Figure 3:
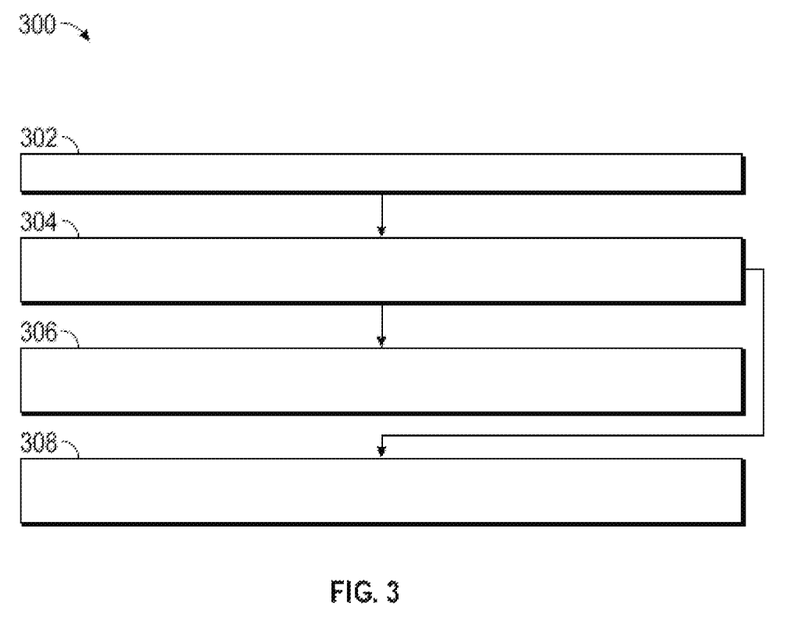
FIG. 3 depicts a flow diagram of a method for processing environmental data for vehicles according to one or more embodiments described herein.

FIG. 3 depicts a flow diagram of a method 300 for automated incident detection for vehicles according to one or more embodiments described herein. The method 300 can be performed by any suitable system or device such as the processing system 110 of FIGS. 1 and 2 or any other suitable processing system and/or processing device (e.g., a processor). The method 300 is now described with reference to the elements of FIGS. 1 and/or 2 but is not so limited.

At block 302, the processing system 110 receives first data from a sensor (e.g., one or more of the cameras 120 123, 130 133; the radar sensor 140; the LiDAR sensor 141; the microphone 142; etc.) of a vehicle.

At block 304, the processing system 110 determines whether an incident external to the vehicle has occurred by processing the first data using a machine learning model. For example, as described herein, the decision engine 114 processes the data collected by the sensors. Particularly, the decision engine 114 monitors the sensors 202, using the data received/collected at block 204, for an indication of an incident. According to one or more embodiments described herein, the decision engine 114 can utilize artificial intelligence (e.g., machine learning) to detect features within the sensor data (e.g., a captured image, a recorded soundwave, etc.) that are indicative of an incident. For example, using the data received/collected at block 204, the decision engine 114 can detect the presence of an emergency vehicle or other first responder vehicle, such as an ambulance, a fire engine, a law enforcement vehicle, and the like.

At block 306, the processing system 110 initiates recording of second data by the sensor responsive to determining that an incident external to the vehicle has occurred. For example, the processing system 110 initiates recording of video responsive to detecting an incident based on recorded audio.

At block 308, the processing system 110 takes an action to control the vehicle responsive to determining that an incident external to the vehicle has occurred. Taking an action includes the processing system 110 causing another system, device, component, etc. to take the action. In some examples, the processing system 110 controls the vehicle 100, such as to execute a driving maneuver (e.g., change lanes, change velocity, etc.), initiate recording from sensors of the vehicle 100, cause recorded data to be stored in the data store 111 and/or the data store 151 of the remote processing system 150, and perform other suitable actions.

Additional processes also may be included, and it should be understood that the process depicted in FIG. 3 represents an illustration and that other processes may be added, or existing processes may be removed, modified, or rearranged without departing from the scope and spirit of the present disclosure.

Figure 4:
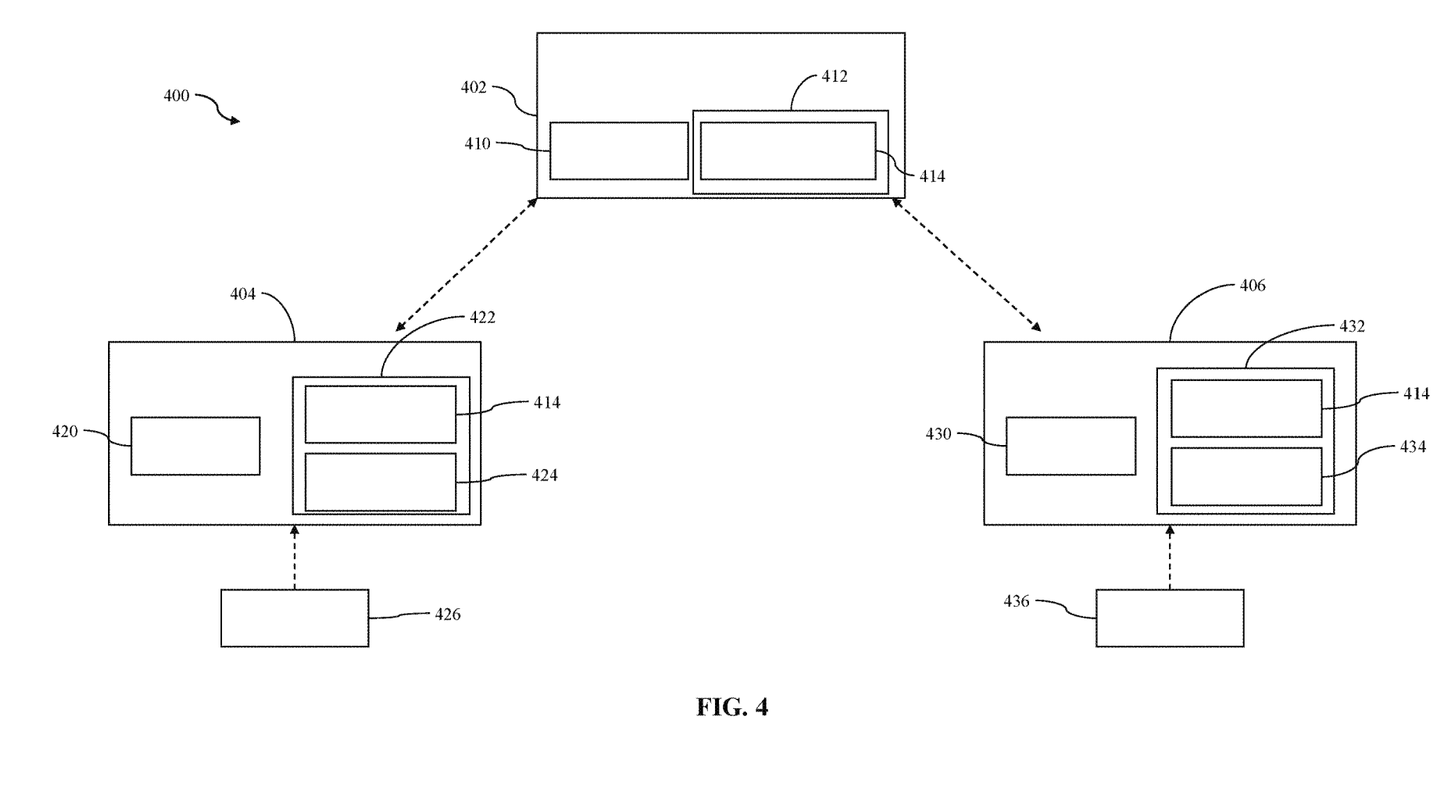
FIG. 4 depicts a block diagram of a federated learning system according to one or more embodiments described herein.

FIG. 4 depicts an exemplary federated learning system 400 that includes a central node 402 that is coupled to any number of different edge nodes 404, 406 over one or more networks (e.g., network 152). It should be appreciated that although FIG. 4 depicts a simplified embodiment with two edge nodes 404, 406 for purposes of explanation, in practice, a federated learning system 400 may include any number of different edge nodes, and the subject matter described herein is not limited to any particular number of edge nodes.

The central node 402 generally represents a central server, a remote server or any other sort of remote processing system (e.g., remote processing system 150) capable of communicating with edge nodes 404, 406 over a network.

The central node 402 includes processing system 410, which could be realized using any sort of processor, controller, central processing unit, graphics processing unit, microprocessor, microcontroller and/or a combination thereof that is suitably configured to determine one or more classification model(s) 414 that are generic, global, or otherwise location-independent and update or otherwise adapt the global classification model(s) 414 using federated learning as described in greater detail below. The central node 402 also includes a data storage element 412, which could be realized as any sort of memory (e.g., a random-access memory, a read-only memory, etc.), data store (e.g., a solid state drive, a hard disk drive, mass storage, etc.), database or the like that is coupled to the processing system 410 and configured to store or otherwise maintain the classification model(s) 414 determined by the processing system 410 for distribution to the edge nodes 404, 406.

Similar to the central node 402, in exemplary embodiments, the edge nodes 404, 406 include a respective processing system 420, 430 and data storage element 422, 432 suitably configured to receive the global classification model(s) 414 from the central node 402 and store or otherwise maintain local instances of the global classification model(s) 414 at the respective edge node 404, 406. As described in greater detail below, the edge nodes 404, 406 also store or otherwise maintain one or more local classification models 424, 434 that are locally determined, at the respective edge node 404, 406, by training, adapting or otherwise updating an initial global classification model 414 using a respective set of data 426, 436 that is locally available at the respective edge node 404. The local data 426 available at the first edge node 404 is distinct or otherwise different from the local data 436 available at the second edge node 406, and therefore, the resulting locally-adapted classification model 424 that is trained or otherwise determined at the first edge node 404 may be different from the locally-adapted classification model 434 that is trained or otherwise determined at the second edge node 406.

In one or more embodiments, the federated learning system 400 is realized using a vehicle communication system where the edge nodes 404, 406 are realized as different instances of the vehicle 100 and the local data 426, 436 includes the image data, sensor data, radar data, object data and/or any other sort of data that is generated, sensed or otherwise collected from the cameras 120-123, 130-133, the radar sensor 140, the LiDAR sensor 141, the microphone 142 and/or other components that are located onboard or otherwise associated with the respective vehicle 100. Additionally, in exemplary embodiments, the local data 426, 436 utilized to train, update or otherwise determine the locally-adapted classification model(s) 424, 434 includes location data obtained from a global positioning system (GPS) or other navigation system associated with the respective vehicle 100. In this regard, the locally-adapted versions of the classification model(s) 424, 434 may be configured to receive, as one or more input parameters, location data characterizing the current location of the respective edge node 404, 406, which, in turn, results in the local classification model(s) 424, 434 generating or otherwise providing an output that is location-dependent as a function of the input location data associated with the respective sensor data input to the respective model 424, 434.

Still referring to FIG. 4, in exemplary embodiments, the edge nodes 404, 406 transmit or otherwise provide information pertaining to the respective localized classification model(s) 424, 434 to the central node 402, which in turn, utilizes the information pertaining to the different localized classification model(s) 424, 434 to train, update or otherwise adapt the corresponding generic, location-independent classification model(s) 414 maintained at the central node 402 in accordance with federated learning principles. For example, the edge nodes 404, 406 may be configured to determine the localized classification model(s) 424, 434 using principal component analysis (PCA) or another machine learning technique suitable for use with federated learning, and then transmit or otherwise provide one or more statistics, performance metrics or other parameters indicative of the respective localized classification model 424, 434 and/or the respective underlying local data 426, 436 associated with the respective localized classification model 424, 434 to the central node 402. Thereafter, in accordance with federated learning principles, the central node 402 aggregates or otherwise combines the statistics, performance metrics or other parameters indicative of the updates to the respective localized classification model(s) 424, 434 and then updates the generic, location-independent classification model(s) 414 in accordance with the received statistics, performance metrics or other parameters to better reflect the respective localized classification model 424, 434 and/or the respective underlying local data 426, 436 associated with the respective localized classification model 424, 434 distributed across the different edge nodes 404, 406. Thereafter, the central node 402 may push, broadcast or otherwise transmit the updated generic, location-independent classification model(s) 414 that reflects federated learning derived from the different localized classification models to the edge nodes 404, 406 for future use.

Figure 5:
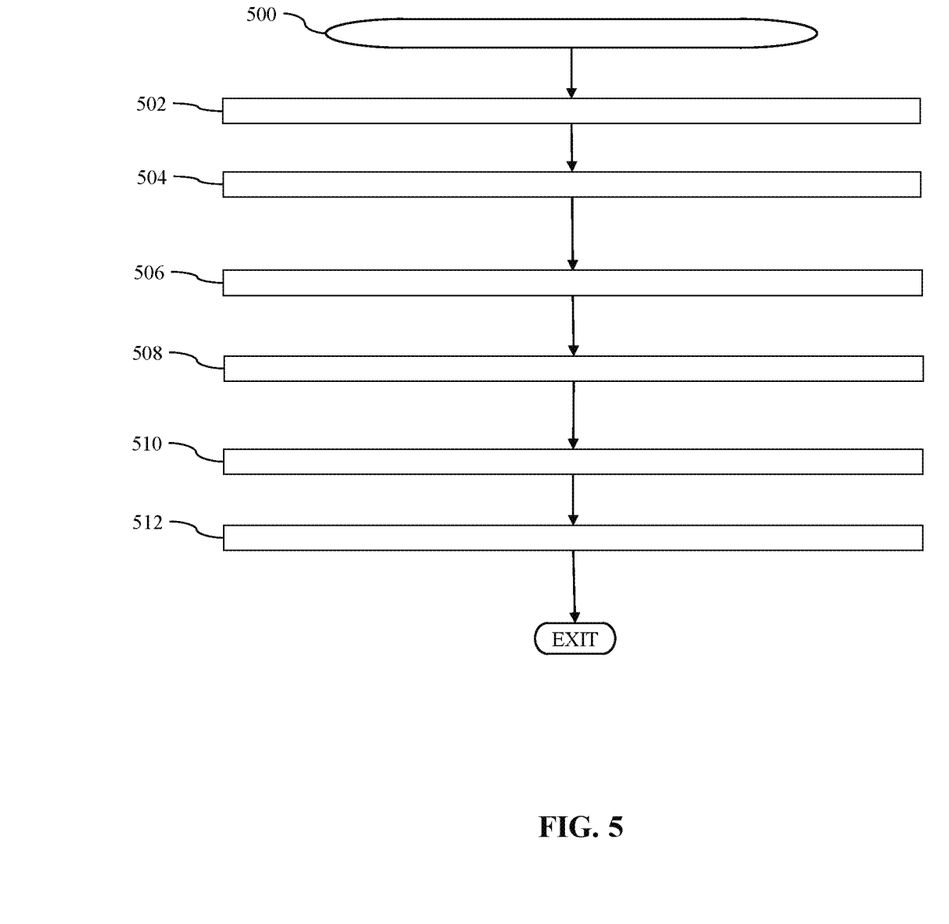
FIG. 5 depicts a flow diagram of a federated learning process suitable for implementation in connection with one or more vehicles in a federated learning system according to one or more embodiments described herein.

FIG. 5 depicts an exemplary embodiment of a federated learning process 500 suitable for implementation with one or more vehicles according to one or more embodiments described herein. It should be appreciated that the order of operation within the federated learning process 500 is not limited to execution sequentially as depicted in FIG. 5 but may be performed in one or more varying orders as applicable and in accordance with the present disclosure. Moreover, one or more of the tasks shown and described in the context of FIG. 5 could be omitted from a practical embodiment of the federated learning process 500 while still achieving the generally intended overall functionality. For illustrative purposes, the following description may refer to elements mentioned above in connection with FIGS. 1-2 and 4. In this regard, while portions of the federated learning process 500 may be performed by different elements of a vehicle system (such as the processing system 110 of FIGS. 1 and 2 or any other suitable processing system), for purposes of explanation, the subject matter may be primarily described herein in the context of the federated learning process 500 being primarily performed or supported by the edge nodes 404, 406 in concert with the central node 402.

Still referring to FIG. 5, the federated learning process 500 initializes or otherwise begins by identifying, receiving or otherwise obtaining, at an edge node, a set of local sensor data that was classified, labeled or otherwise assigned a particular object type using an object classification model at 502 and identifying, receiving or otherwise obtaining, at the edge node, a set of location data associated with that labeled local data set at 504. For example, in one or more embodiments, the processing system 420 at an edge node 404 (e.g., the processing system 110 of vehicle 100) identifies or otherwise obtains the timestamped sequence of samples of sensor data 426 from one or more onboard sensing devices 120-123, 130-133, 140, 141, 142 that was detected, classified or otherwise identified as being associated with an emergency vehicle using a generic, location-independent emergency vehicle classification model 414 that was initially provided by the central node 402. Additionally, the processing system 420 identifies or otherwise obtains the location data contemporaneous to the local sensor data 426 from a GPS or other navigation system associated with the edge node 100, 404.

At 506, after obtaining the labeled sensor data set and corresponding location information associated with a detected objected classified as a particular object type using a corresponding classification model, the federated learning process 500 determines a localized classification model associated with that particular object type for classifying or otherwise labeling future detected objects as that object type as a function of the sensor data and corresponding location data. For example, in one embodiment, after classifying a detected object nearby the vehicle 100, 404 as an emergency vehicle using an initial generic emergency vehicle classification model 414 provided by the central node 402, the processing system 110, 420 onboard the vehicle 100, 404 determines a localized emergency vehicle classification model 424 using the labeled sensor data from the onboard sensing devices 120-123, 130-133, 140, 141, 142 and the contemporaneous location information. In some embodiments, the labeled sensor data from the onboard sensing devices 120-123, 130-133, 140, 141, 142 and the contemporaneous location information associated therewith is utilized as a part of a training data set to train, learn or otherwise develop a localized emergency vehicle classification model 424 for classifying a detected object as an emergency vehicle as a function of the sensor data associated with the detected object and the contemporaneous location information associated with the detected object. That said, in other embodiments, the labeled sensor data from the onboard sensing devices 120-123, 130-133, 140, 141, 142 and the contemporaneous location information may be utilized to adapt or otherwise update the generic emergency vehicle classification model 414 to obtain the localized emergency vehicle classification model 424 from the initial generic emergency vehicle classification model 414 (e.g., by retraining or updating the initial generic emergency vehicle classification model 414 using the obtained data as training data).

It should be noted that steps 502, 504 and 506 may be repeated in practice to iteratively refine and adapt the local classification models 424, 434 at the vehicles 100, 404, 406 to improve the accuracy and reliability of classification at the vehicles 100, 404, 406 for each detected object for which labeled sensor data and contemporaneous location data exists. Thus, each time an object of a particular type is detected, the local classification model 424, 434 associated with that particular type of object may be updated, adapted or otherwise refined to improve subsequent classification. In this regard, by defining and adapting a local classification model 424, 434 that is feature-based but is also location-dependent or otherwise weighted using location information, the federated learning process 500 addresses data diversity challenges by accounting for localized data diversity. For example, emergency vehicles in a particular city, state or region may have a particular color, shape or other characteristic that differs from the same type of emergency vehicle in another city, state or region. Thus, by developing a local classification model 424, 434 that classifies the sensor feature data associated with a detected object as a function of the current location of the ownship vehicle 100, 404, 406 and/or the detected object, detected objects exhibiting location-specific characteristic features may be classified with a higher level of confidence or accuracy using the local classification model 424, 434 that accounts for the data diversity or variability in characteristic features associated with the same type or class of object with respect to location or across different geographic regions. Furthermore, the local classification models 424, 434 may also evolve to account for changes to the characteristic features associated with a particular type or class of object over time (e.g., fleet upgrades, different color schemes, etc.).

In one implementation, the local classification model is realized using a support-vector machine (SVM) trained using location and time dependent sequences of sensor data associated with detected objects having a known classification derived from using the global classification model associated with that object type. In this regard, a detected object may be associated with a time-dependent sequence of associated sensor feature data for the detected object and corresponding tracked locations for the detected object and/or contemporaneous ownship vehicle locations that are suitable for use as an input object data set to a classification model. Each sample of sensor feature data may be input or otherwise provided to an instance of a global classification model 414 at the respective vehicle to classify the detected object with an estimated confidence level associated with the classification as that particular object type associated with that global classification model 414. When the number or percentage of sensor feature data samples in the input object data set (e.g., greater than 20% of the sequence) are assigned an estimated classification confidence greater than a threshold (e.g., a probability or confidence greater than 80%), that object type label associated with that global classification model 414 is assigned to the detected object and each of the sensor feature data samples of the input object data set, thereby extrapolating or otherwise extending the object label across the entire set of data associated with a common detected and tracked object. As described in greater detail below, in other implementations, when the ownship vehicle is unable to classify or otherwise assign an object type label to a detected object with a desired level of confidence, the ownship vehicle may query other nearby vehicles or other external systems or devices using the time and location data associated with the detected object to obtain an object type label assigned to that same object by a nearby vehicle or another external source. The crowdsourced label received from another vehicle or external source may then be assigned to each of the sensor feature data samples of the input object data set associated with the detected object.

Thereafter, the entire time-dependent sequence of sensor feature data, location data and classified object type label associated with that detected object can be utilized to train or otherwise develop a local classification model associated with that particular type of object using a SVM or other model configured to calculate, estimate or otherwise determine a classification confidence or probability for that particular object type as a function of both the input sensor feature data and associated location data. The updated support vectors that define the classification boundary for the localized model update may also be stored or otherwise maintained for subsequent provisioning to the central node to support federated learning with respect to the global classification model for that particular object type. In addition to developing a localized classification model, the entire time-dependent labeled sequence of sensor feature data and location data may be utilized to support crowdsourcing object classification and providing indicia of object classifications to other nearby vehicles, as described herein.

Still referring to FIG. 5, the illustrated federated learning process 500 continues at 508 by transmitting or otherwise providing indicia of the local classification model determined at 506 to the central node for updating the generic, location-independent classification model at 510. For example, the vehicles 100, 404, 406 may periodically push, upload or otherwise transmit statistics, performance metrics or other parameters indicative of the local classification model(s) 424, 434 to a central server 402, which then aggregates or otherwise combines the statistics, performance metrics, parameters or other indicia of the different localized classification model(s) 424, 434 to update the generic, location-independent classification model(s) 414 in a manner that is influenced by the different localized classification model(s) 424, 434 without accessing or otherwise retrieving the local data 426, 436 upon which the localized classification model(s) 424, 434 are based at the central server 402. In this regard, in some embodiments, the vehicles 100, 404, 406 may provide statistics or other metrics characterizing the underlying the local data 426, 436 (e.g., sensor data and contemporaneous location data) upon which the local classification model(s) 424, 434 were adapted to allow the processing system 410 at the central server 402 to update the global classification model(s) 414 in the appropriate manner while maintaining privacy with respect to the local data 426, 436 at the vehicles 100, 404, 406.

For example, a first vehicle 100, 404 trains, learns or otherwise develops a localized ambulance classification model 424 for classifying a detected object as an ambulance as a function of the detected object sensor data from the onboard sensing devices 120-123, 130-133, 140, 141, 142 and the contemporaneous location information for the vehicle 100, 404, while a second vehicle 100, 406 in a different city, state or geographic region similarly develops a localized ambulance classification model 434 specific to the location where the second vehicle 100, 406 has been operated. Thereafter, the first vehicle 100, 404 may push, upload or otherwise transmit statistics, performance metrics or other parameters indicative of its localized ambulance classification model 424 and/or the underlying local data 426 specific to the geographic region where the first vehicle 100, 404 has been operated in the past to the central server 402, while the second vehicle 100, 406 may similarly provide indicia of its localized ambulance classification model 434 and/or the underlying local data 436 specific to the geographic region where the second vehicle 100, 406 has been operated in the past to the central server 402. Thereafter, the processing system 410 at the central server 402 aggregates or otherwise combines the indicia of the localized ambulance classification model 424 associated with the first vehicle's geographic operating region with the localized ambulance classification model 434 associated with the second vehicle's geographic operating region and then updates the global, location-independent ambulance classification model 414 in a manner that is influenced by the similarities of the different localized classification model(s) 424, 434 and/or the differences between the different localized classification model(s) 424, 434 and the prior global ambulance classification model 414. As a result, the updated global ambulance classification model 414 determined at the central server 402 may better account for data diversity and variations between different geographic regions.

In one or more implementations, when the classification models 414, 424, 434 are realized using SVMs, the support vectors defining the classification boundaries associated with the updates to the different localized classification model(s) 424, 434 are uploaded or otherwise provided to the central server 402. At the central server 402, the processing system 410 combines the updated support vectors received from the different vehicle edge nodes 404, 406 corresponding to the different localized classification model(s) 424, 434 with the support vectors associated with the global classification model 414 to re-train, update or otherwise adapt the global classification model 414 using the updated support vectors from the vehicle edge nodes 404, 406. In this regard, by providing support vectors from different vehicle edge nodes 404, 406 that are operated in different, diverse or varied geographic locations, the resulting global classification model 414 may be location-independent.

Still referring to FIG. 5, after updating the global classification model, the federated learning process 500 continues at 512 by downloading or otherwise obtaining the updated global classification model(s) from the central node at the edge nodes. For example, in some embodiments, the central server 402 may automatically push, broadcast or otherwise transmit an updated global classification model 414 that is generic or otherwise location-independent to the vehicles 100, 404, 406, which, in turn overwrite the existing copy of the generic, location-independent classification model 414 with the updated global classification model 414. In this regard, the vehicles 100, 404, 406 may utilize a global classification model 414 to classify or otherwise assign an object type label to a detected object when a global classification model 414 achieves a higher confidence level than the localized classification model(s) 424, 434. For example, when a vehicle 100, 404, 406 travels from a home region where the localized emergency vehicle classification model 424, 434 is well adapted to a different geographic region where emergency vehicles exhibit different characteristic features, the global classification model 414 may detect, recognize or otherwise assign the emergency vehicle object type to the local sensor data 426, 436 with a higher confidence level than the localized emergency vehicle classification model 424, 434 that has not been trained using data specific to that new geographic region. Thus, by virtue of the federated learning process 500 enabling the central node 402 to adapt the generic global classification model(s) 414 in a manner that accounts for data diversity, object classification may be improved when vehicles 100, 404, 406 are operated in new or unfamiliar geographic regions.

In practice, the federated learning process 500 may repeat to iteratively update both the generic, location-independent global classification models determined at the central node 402 over time using federated learning while also adapting localized classification models to the particular geographic regions where the respective vehicles 100, 404, 406. As a result of the federated learning process 500, the resulting global classification models derived at the central node 402 may be more robust and achieve better performance by accounting for data diversity or variability exhibited across different geographic regions observed by the vehicle edge nodes 100, 404, 406. At the same time, the localized classification models at the respective vehicles 100, 404, 406 are adapted to their respective geographic operating regions, thereby improving performance locally at the vehicle edge nodes 100, 404, 406.

Figure 6:
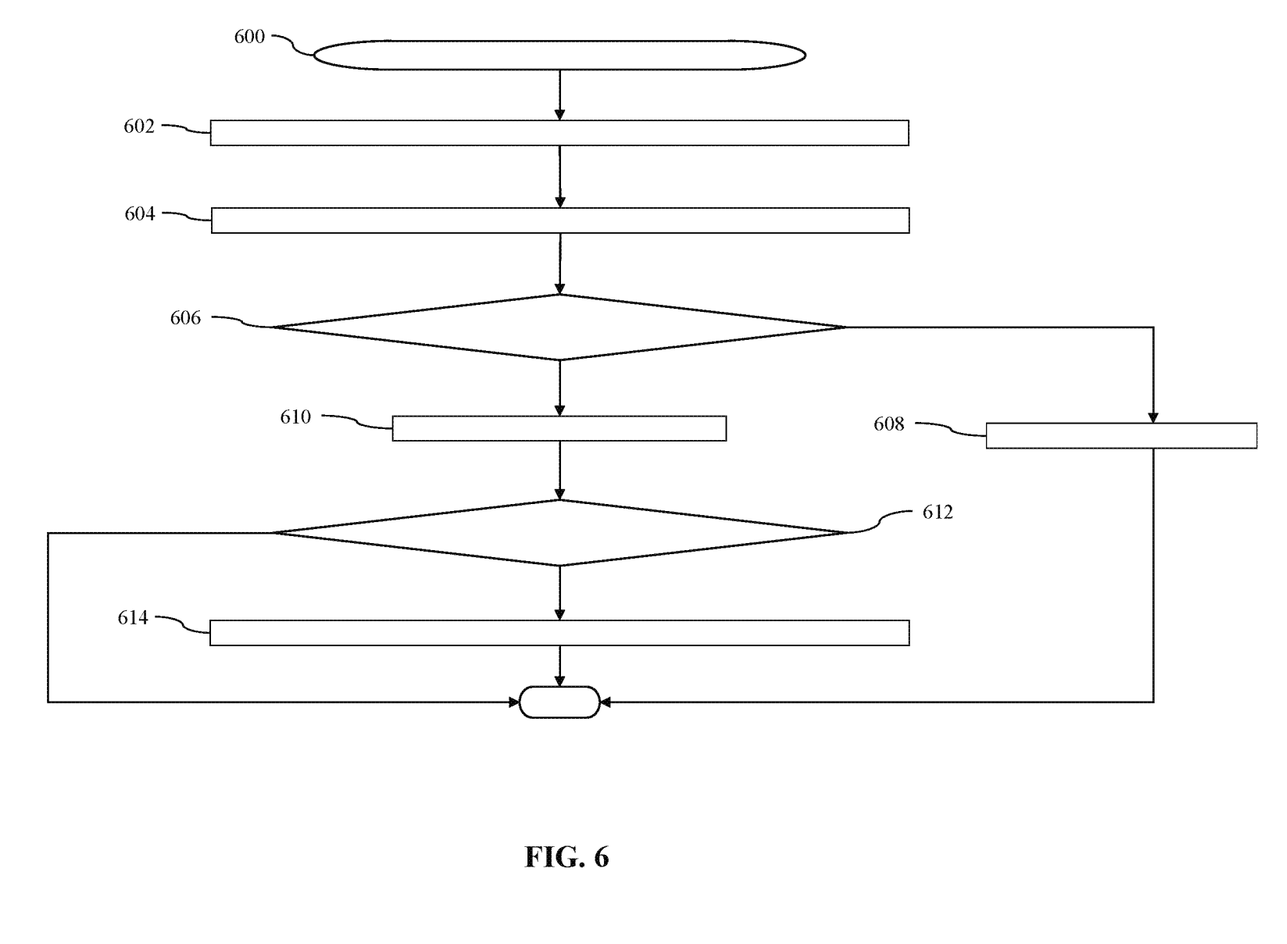
FIG. 6 depicts a flow diagram of an enhanced labeling process suitable for implementation at one or more vehicles in a federated learning system according to one or more embodiments described herein.

FIG. 6 depicts an exemplary embodiment of an enhanced labeling process 600 suitable for implementation with one or more vehicles in connection with the federated learning process 500 of FIG. 5 according to one or more embodiments described herein. For example, referring to FIGS. 1-5, in exemplary embodiments, the enhanced labeling process 600 is performed at a vehicle to increase the availability and amount of labeled sets of sensor data available at the vehicle at step 502 of the federated learning process 500 for developing, training or otherwise updating the localized classification model at step 506. In this regard, the enhanced labeling process 600 addresses the problems of labeling detected object sensor data samples were there would otherwise be low confidence or inability to assign a label or classification to those data samples, for example, due to variations in the viewing perspective of the detected object and/or the inability to view or identify characteristic features of the detected object from the ownship vehicle perspective. In addition to the challenges posed by data diversity and/or location-dependent variations in characteristic features as described above, classification of a detected object at the vehicle may also be limited by the orientation of the detected object with respect to the vehicle, for example, by only being able to perceive a rear view of an emergency vehicle rather than multiple different views of the emergency vehicle (e.g., side and/or front views).

It should be appreciated that the order of operation within the enhanced labeling process 600 is not limited to execution sequentially as depicted in FIG. 6 but may be performed in one or more varying orders as applicable and in accordance with the present disclosure. Moreover, one or more of the tasks shown and described in the context of FIG. 6 could be omitted from a practical embodiment of the enhanced labeling process 600 while still achieving the generally intended overall functionality. For illustrative purposes, the following description may refer to elements mentioned above in connection with FIGS. 1-2 and 4. In this regard, while portions of the enhanced labeling process 600 may be performed by different elements of a vehicle system, for purposes of explanation, the subject matter may be primarily described herein in the context of the enhanced labeling process 600 being primarily performed or supported by or at a vehicle 100 that functions as an edge node 404, 406 in a federated learning system 400.

The enhanced labeling process 600 initializes or otherwise begins by analyzing sensor data obtained from one or more sensing devices associated with the vehicle to detect or otherwise identify a set or sequence of sensor data samples that correspond to the presence of an object in the vicinity of the vehicle at 602 and then storing or otherwise maintaining the sequence of sensor data samples for the detected object in association with location information and temporal information for the detected object data set at 604. For example, as described above, the processing system 110, 420 associated with a vehicle 100, 404 may include a decision engine 114 that analyzes the local sensor data 426 generated from the sensing devices 120-123, 130-133, 140, 141, 142 onboard the vehicle 100, 404 to detect and/or track an object relative to the vehicle 100, 404. After identifying a set or sequence of sensor data samples from one or more onboard sensing devices 120-123, 130-133, 140, 141, 142 that are associated with a detected and/or tracked object in the vicinity of the vehicle 100, 404, the processing system 110, 420 stores or otherwise maintains the sensor data samples in association with the time (or timestamps) associated with the respective sensor data samples and location information associated with the time (or timestamps) associated with the respective sensor data samples. For example, based on the timestamps associated with the sensor data samples and the timestamps associated with the location data samples obtained from GPS or other onboard vehicle navigation system, the processing system 110, 420 may associate the detected object sensor data set with the contemporaneous or current location of the vehicle 100, 404 at the time the object was detected. In practice, the location data maintained in association with the detected object sensor data set may include the current or contemporaneous location of the vehicle 100, 404 along with a corresponding location of the detected object at that respective time that is estimated, determined or otherwise derived from the own-ship vehicle location using the sensor data (e.g., based on the distance determined using lidar or radar at a particular orientation relative to the vehicle).

At 606, the enhanced labeling process 600 analyzes the detected object sensor data set to identify or otherwise determine whether at least one sample of the sensor data set for the detected object can be classified, labeled or otherwise assigned a particular object type using a classification model for detecting that object type. For example, the processing system 110, 420 may sequentially analyze the combination of sensor data samples and location information associated with a respective timestamp to determine whether that particular view of the detected object (or time slice of object sensor data) can be classified or labeled with a desired level of confidence. In this regard, the processing system 110, 420 may input or otherwise provide the sensor data samples and contemporaneous location information associated with a first timestamp of the detected object sensor data set to the localized ambulance classification model 424 determine whether that particular view of the detected object (or time slice of object sensor data) can be classified as an ambulance with an associated confidence level or other performance metric that is greater than a classification threshold. When the localized ambulance classification model 424 is unable to classify the detected object with the desired level of confidence, the processing system 110, 420 proceeds with inputting or otherwise providing the sensor data samples associated with that timestamp to the global ambulance classification model 414 and/or other global or local classification models 414, 424 available at the vehicle 100, 404.

When the classification models 414, 424 are unable to classify or label the sensor data samples associated with a particular timestamp with a confidence level greater than the classification threshold, the processing system 110, 420 may sequentially analyze the combination of sensor data samples and location information associated with the next respective timestamp to determine whether that particular view of the detected object (or time slice of object sensor data) can be classified or labeled with a desired level of confidence until the entire sequence of detected object sensor data has been analyzed.

At 608, when one of the classification models is able to classify, label or otherwise assign an object type to a sensor data sample with the desired level of confidence, the enhanced labeling process 600 continues by labeling or otherwise assigning the other sensor data samples associated with that same tracked and/or detected object with that assigned object type. For example, if the sequence of sensor data samples associated with a detected object includes rear and oblique views of the object in addition to side views, and the processing system 110, 420 is only able to classify the sensor data sample corresponding to the side view as a particular object type (e.g., an ambulance) with the desired level of confidence, the processing system 110, 420 may extend that classification to assign the same object type to the preceding and/or subsequent data samples of the detected object sensor data set that were identified as belonging to the same object in the vicinity of the vehicle 100, 404 based on the temporal and/or spatial relationship between the sensor data samples (e.g., when the differences in location, spatial orientation and/or characteristic features and differences between timestamps are less than respective object tracking thresholds indicative of a same object). In this manner, the enhanced labeling process 600 may label more diverse or varied views of a detected object, thereby increasing the size of the labeled data set used to train the localized classification models (at 502), which, in turn, improves the performance and robustness of the localized classification models (derived at 504).

Still referring to FIG. 6, when the enhanced labeling process 600 is unable to classify or otherwise assign an object type label to a detected object sensor data set, the enhanced labeling process 600 continues by broadcasting or otherwise transmitting a request for a classification or label for the detected object to one or more other vehicles at 610. In this regard, a vehicle 100, 404 may utilize V2V communication to query other vehicles operating in the vicinity of the vehicle 100, 404 over a network 152 for indication of whether another vehicle operating in the vicinity of the vehicle 100, 404 was able to classify or label a detected object that was located at substantially the same location at the same time as a respective sensor data sample of the detected object sensor data set. For example, the vehicle 100, 404 may broadcast a request over a V2V communication network 152 that includes information identifying the timestamps and corresponding locations associated with the detected object. A second vehicle 100, 406 operating in the vicinity of the requesting vehicle 100, 404 may receive the request and analyze the detected object data stored or otherwise maintained at the second vehicle 100, 406 to determine whether the processing system 110, 430 onboard the second vehicle 100, 406 was able to classify or label an objected detected at substantially the same location at substantially the same time. For example, the second vehicle 100, 406 may have been positioned to observe a side view of an ambulance which allowed the second vehicle 100, 406 to classify the detected object at that location as an ambulance, while sensor data samples at the requesting vehicle 100, 404 only captured the rear view, an oblique view, a partial view or were otherwise unable to allow the processing system 110, 420 at the requesting vehicle 100, 404 to classify the detected object as an ambulance with the desired level of confidence. In response to identifying a classified detected object that matches the location and time associated with the request, the second vehicle 100, 406 may transmit or otherwise provide a response to the query that include indicia of the object type assigned to the object detected at substantially the same time and location.

In response to receiving a response that indicates that one or more other vehicles were able to classify the detected object at 612, the enhanced labeling process 600 continues by labeling or otherwise assigning that crowdsourced object type to all of the sensor data samples associated with that same tracked and/or detected object at 614 in a similar manner as described above at 608. In this regard, when a neighboring vehicle 100, 406 is able to classify a detected object as a particular object type (e.g., an ambulance) with the desired level of confidence, the processing system 110, 420 may extend that classification to assign the same object type (and the associated confidence level assigned by the neighboring vehicle 100, 406) to its own local sensor data samples that correspond to that same detected object in the vicinity of the vehicle 100, 404. In this regard, when multiple different vehicles respond to a query request, the processing system 110, 420 may combine or otherwise augment the responses to obtain an aggregate response before assigning the most likely object type to the detected object. For example, when multiple different vehicles assign the same object type to an object detected at substantially the same time and location, the processing system 110, 420 may increase the confidence level associated with that classification to an aggregate confidence level that is greater than the individual confidence levels from any one vehicle. On the other hand, when multiple different vehicles assign the different object types to an object detected at substantially the same time and location, the processing system 110, 420 may implement one or more voting schemes to arbitrate among the classifications to determine a most likely object type to be assigned to the detected object and a corresponding adjusted confidence level that accounts for the discrepancies between different vehicles. In the absence of a response from other vehicles, the enhanced labeling process 600 exits without classifying or labeling the detected object.

Referring to FIG. 6 with reference to FIG. 5, it should be appreciated that the enhanced labeling process 600 and the federated learning process 500 may be implemented concurrently and work in concert with one another to improve object classification in an unsupervised manner. For example, the enhanced labeling process 600 may increase the amount of local data 426, 436 that can be labeled or classified and used for development of the localized classification models 424, 434 at 502. Development of an improved localized classification model 424, 434 at a vehicle 100, 404, 406 at 506 of the federated learning process 500, in turn, improves the ability of the processing system 110, 420, 430 at the vehicle 100, 404, 406 to classify individual data samples at 606 and assign labels to a larger set of sensor data samples associated with the same object at 608 of the enhanced labeling process 600, thereby increasing the available data at 502 and 504 and improving refinement of the localized classification models 424, 434 during subsequent iterations of the federated learning process 500 at 506. The localized classification models 424, 434 also increases the likelihood of another vehicle operating at or around substantially the same location at substantially the same time being able to classify or label detected objects and provide corresponding indicia at 612 in response to a receiving a query request from the ownship vehicle at 610, which by allowing the ownship vehicle to assign a label to a detected object sensor data set that would otherwise go unlabeled at 614, improves the available data at 502 to improve future development of the localized classification model at 506 in a manner that better accounts for different, challenging or otherwise hard to classify views of the object. Furthermore, the federated learning process 500 allows the global classification models 414 developed at the central node 402 at 510 to also reflect the improved localized models that benefit from the enhanced labeling process 600 and are received at 508. Improving the global model provided back to the vehicle edge nodes at 512 also increases the likelihood of the vehicle edge nodes being able to classify an object that would otherwise not be classifiable with the desired confidence level using a localized model in connection with the enhanced labeling process 600, which similarly improves the development of the localized model and future iterations of the global model.

Referring to FIGS. 1-6, by virtue of the federated learning process 500, the federated learning system 400 addresses data diversity challenges by using localized models that are adapted using local data associated with prior location information from the vehicle to provide classification or clustering that is feature-based while also being weighted or dependent on location to improve automated incident detection. In concert with the federated learning process 500, the enhanced labeling process 600 addresses labeling challenges in unsupervised learning to account for difficult or challenging classification scenarios with unknown detected objects by using object tracking and localization to associate related sensor data samples along with crowdsourcing to obtain classifications or labels assigned by other vehicles. By improving the ability of the decision engine 114 to detect and classify an emergency vehicle or other first responder vehicle with a higher degree of confidence by improving the underlying classification models, the processing system 110 of a vehicle 100 may more quickly and/or more accurately detect a corresponding incident (e.g., at 304 of method 300) external to the vehicle and initiate appropriate actions responsive to the detected incident (e.g., 306 and/or 308 of method 300).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:
obtaining, at a vehicle, sensor data for a detected object external to the vehicle from a sensor of the vehicle;
obtaining, at the vehicle, location data associated with the detected object;
obtaining, at the vehicle, a localized vehicle classification model associated with a first responder vehicle type;
assigning the first responder vehicle type to the detected object based on an output by the localized vehicle classification model as a function of the sensor data and the location data using the localized vehicle classification model;
automatically determining that an incident external to the vehicle has occurred responsive to assigning the first responder vehicle type to the detected object; and
initiating, at the vehicle, an action responsive to automatically determining the incident has occurred.

2. The method of claim 1, wherein initiating the action comprises updating, at the vehicle, the localized vehicle classification model using the sensor data and the location data associated with the sensor data.

3. The method of claim 2, further comprising transmitting, by the vehicle, indicia of the localized vehicle classification model to a remote server over a network after updating the localized vehicle classification model.

4. The method of claim 3, further comprising receiving, at the vehicle, an updated global classification model associated with the first responder vehicle type from the remote server over the network after transmitting the indicia of the localized vehicle classification model to the remote server, wherein the remote server determines the updated global classification model associated with the first responder vehicle type using the indicia of the localized vehicle classification model.

5. The method of claim 1, wherein initiating the action comprises:
obtaining second sensor data from the sensor of the vehicle at a second time different from a first time associated with the sensor data;

obtaining second location data associated with the second sensor data at the second time, wherein the second location data is different from the location data;
associating the second sensor data and the second location data with the detected object based on a first relationship between the second location data and the location data and a second relationship between the second time and the first time; and
assigning the first responder vehicle type to the second sensor data and the second location data when a confidence value output by the localized vehicle classification model for the combination of the sensor data and the location data is greater than a classification threshold.

6. The method of claim 1, further comprising:
transmitting, by the vehicle over a network, a request for a classification associated with the detected object when the confidence value output by the localized vehicle classification model is less than a classification threshold, wherein the request includes the location data associated with the detected object; and
receiving, at the vehicle over the network, indication of the first responder vehicle type from a second vehicle responsive to the request.

7. The method of claim 6, further comprising assigning the first responder vehicle type indicated by the second vehicle for the detected object to the sensor data and the location data, wherein initiating the action comprises updating, at the vehicle, the localized vehicle classification model using the sensor data and the location data associated with the sensor data.

8. The method of claim 6, further comprising:
obtaining, at the vehicle, second sensor data from the sensor of the vehicle at a second time different from a first time associated with the sensor data;
obtaining, at the vehicle, second location data associated with the second sensor data at the second time, wherein the second location data is different from the location data;
associating the second sensor data and the second location data with the detected object based on a first relationship between the second location data and the location data and a second relationship between the second time and the first time; and
assigning the first responder vehicle type indicated by the second vehicle for the detected object to the second sensor data and the second location data after associating the second sensor data and the second location data with the detected object.

9. The method of claim 8, wherein initiating the action comprises updating, at the vehicle, the localized vehicle classification model using the second sensor data and the second location data associated with the second sensor data after assigning the first responder vehicle type indicated by the second vehicle for the detected object to the second sensor data and the second location data.

10. The method of claim 1, wherein initiating the action comprises taking the action to control the vehicle in a manner that is influenced by the first responder vehicle type.

11. A vehicle comprising:
a sensor to provide sensor data for a detected object external to the vehicle;
a navigation system to provide location data for the vehicle contemporaneous to the sensor data;
a memory comprising computer readable instructions and a localized vehicle classification model associated with a first responder vehicle type; and
a processing device for executing the computer readable instructions, the computer readable instructions controlling the processing device to perform operations comprising:
assigning the first responder vehicle type to the detected object based on an output by the localized vehicle classification model as a function of the sensor data and the location data using the localized vehicle classification model;
automatically determine that an incident external to the vehicle has occurred responsive to assigning the first responder vehicle type to the detected object; and
initiating an action responsive to automatically determining the incident has occurred.

12. The vehicle of claim 11, wherein the action comprises updating the localized vehicle classification model using the sensor data and the location data associated with the sensor data.

13. The vehicle of claim 12, wherein the action further comprises transmitting indicia of the localized vehicle classification model to a remote server over a network.

14. The vehicle of claim 11, wherein the processing device is configurable to perform operations further comprising:
obtaining second sensor data from the sensor, the second sensor data being associated with a second time different from a first time associated with the sensor data;
obtaining second location data associated with the second sensor data at the second time, wherein the second location data is different from the location data;
associating the second sensor data and the second location data with the detected object based on a first relationship between the second location data and the location data and a second relationship between the second time and the first time; and
assigning the first responder vehicle type to the second sensor data and the second location data when a confidence value output by the localized vehicle classification model as the function of the sensor data and the location data is greater than a classification threshold.

15. The vehicle of claim 11, wherein the processing device is configurable to perform operations further comprising:
transmitting, over a network, a request for a classification associated with the detected object when a confidence value output by the localized vehicle classification model is less than a classification threshold, wherein the request includes the location data associated with the detected object;
receiving, over the network, indication of the first responder vehicle type from a second vehicle responsive to the request; and
assigning the first responder vehicle type indicated by the second vehicle for the detected object to the sensor data and the location data.

16. A vehicle system, comprising:
a remote server to provide a first classification model for a first responder vehicle type; and
a vehicle coupled to the remote server over a network to obtain the first classification model from the remote server, wherein the vehicle comprises:
a sensor to provide sensor data for a detected object external to the vehicle;
a navigation system to provide location data for the vehicle contemporaneous to the sensor data;
a memory comprising computer readable instructions; and a processing device for executing the computer readable instructions, the computer readable instructions controlling the processing device to perform operations comprising:

assigning the first responder vehicle type to the detected object based on an output by the first classification model as a function of the sensor data using the first classification model; and responsive to assigning the object type to the detected object:

determining a localized vehicle classification model for the first responder vehicle type using the sensor data and the location data associated with the detected object;

automatically determining that an incident external to the vehicle has occurred responsive to assigning the first responder vehicle type to the detected object; and initiating an action responsive to automatically determining the incident has occurred.

17. The vehicle system of claim 16, wherein the computer readable instructions control the processing device to transmit indicia of the localized vehicle classification model to the remote server over the network.

18. The vehicle system of claim 17, wherein the remote server is configured to update the first classification model in response to receiving the indicia of the localized vehicle classification model from the vehicle over the network.

19. The method of claim 1, wherein the first responder vehicle type comprises at least one of an ambulance, a fire engine, a law enforcement vehicle, and an emergency vehicle.

* * * * *